(12) United States Patent
Alsaleem

(10) Patent No.: US 10,352,783 B2
(45) Date of Patent: Jul. 16, 2019

(54) BUILDING ENVELOPE AND INTERIOR GRADING SYSTEMS AND METHODS

(71) Applicant: Emerson Climate Technologies, Inc., Sidney, OH (US)

(72) Inventor: Fadi Mohammad Alsaleem, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 910 days.

(21) Appl. No.: 14/705,317

(22) Filed: May 6, 2015

(65) Prior Publication Data

US 2015/0323394 A1   Nov. 12, 2015

Related U.S. Application Data

(60) Provisional application No. 61/989,713, filed on May 7, 2014.

(51) Int. Cl.
*G01K 17/20* (2006.01)
*G01K 13/00* (2006.01)

(52) U.S. Cl.
CPC ............. *G01K 17/20* (2013.01); *G01K 13/00* (2013.01)

(58) Field of Classification Search
CPC .. G05B 15/02; F24F 11/0009; H04L 12/2803; H04L 67/10
See application file for complete search history.

(56) References Cited

U.S. PATENT DOCUMENTS 4,574,871 A   3/1986 Parkinson et al.
4,660,759 A   4/1987 Barnard et al.
(Continued)

FOREIGN PATENT DOCUMENTS

CN   1752624 A   3/2006
CN   1910528 A   2/2007
(Continued)

OTHER PUBLICATIONS

Wikipedia: R-Value <https://web.archive.org/web/20140218100015/https://en.wikipedia.org/wiki/R-value_(insulation)> retrieved by Archive.org on Feb. 18, 2014.*
(Continued)

*Primary Examiner* — Alexander Satanovsky
*Assistant Examiner* — Mark I Crohn
(74) *Attorney, Agent, or Firm* — Harness, Dickey & Pierce, P.L.C.

(57) ABSTRACT

A difference module determines differences between an outdoor ambient temperature and an indoor temperature, determines a first average of the differences, and determines a second average of the differences. A storing module stores a first data point, the first data point including the first average and a first total run time of a heating, ventilation, and/or air conditioning (HVAC) system, and stores a second data point, the second data point including the second average and a second total run time of the HVAC system. A fitting module fits a line to the first and second data points. An envelope grading module generates a grade for an exterior envelope of a building based on a first characteristic of the line. An interior grading module generates a grade for an interior of the building based on a second characteristic of the line. A reporting module generates a displayable report for the building including the grade of the exterior envelope and the grade of the interior of the building.

18 Claims, 7 Drawing Sheets

(56) References Cited

U.S. PATENT DOCUMENTS

| | | |
|---|---|---|
| 6,259,959 B1 | 7/2001 | Martin |
| 6,385,510 B1 | 5/2002 | Hoog et al. |
| 7,377,450 B2 | 5/2008 | Van Ostrand et al. |
| 8,800,309 B2 | 8/2014 | Buda et al. |
| 9,285,802 B2 | 3/2016 | Arensmeier |
| 2004/0159113 A1 | 8/2004 | Singh et al. |
| 2005/0125102 A1 | 6/2005 | Nichols et al. |
| 2006/0036349 A1 | 2/2006 | Kates |
| 2007/0109301 A1 | 5/2007 | Smith |
| 2009/0015400 A1 | 1/2009 | Breed |
| 2010/0326470 A1 | 12/2010 | Seippel |
| 2011/0144807 A1 | 6/2011 | Buda et al. |
| 2012/0022702 A1 | 1/2012 | Jang |
| 2012/0072029 A1 | 3/2012 | Persaud et al. |
| 2012/0221150 A1* | 8/2012 | Arensmeier ....... G05B 23/0224 700/276 |
| 2012/0330626 A1 | 12/2012 | An et al. |
| 2013/0096723 A1 | 4/2013 | Ludwig |
| 2013/0176130 A1 | 7/2013 | Hoesl |
| 2013/0179373 A1 | 7/2013 | Mutchnik et al. |
| 2013/0261809 A1 | 10/2013 | Morrow et al. |
| 2014/0005837 A1 | 1/2014 | Fadell et al. |
| 2014/0012422 A1 | 1/2014 | Kates |
| 2014/0074730 A1 | 3/2014 | Arensmeier et al. |
| 2015/0127174 A1 | 5/2015 | Quam et al. |

FOREIGN PATENT DOCUMENTS

| | | | |
|---|---|---|---|
| CN | 1910572 A | 2/2007 | |
| CN | 101616022 A | 12/2009 | |
| CN | 101939597 A | 1/2011 | |
| CN | 102713475 A | 10/2012 | |
| CN | 103403463 A | 11/2013 | |
| CN | 103597292 A | 2/2014 | |
| EP | 1950505 A2 | 7/2008 | |
| EP | 2239388 A1 | 10/2010 | |
| JP | 2008045810 A | 2/2008 | |
| JP | 2008101865 A | 5/2008 | |
| JP | 2008267768 A | 11/2008 | |
| JP | 5597669 B2 | 10/2014 | |
| KR | 101151867 B1 | 5/2012 | |
| WO | WO-2013130799 A1 | 9/2013 | |
| WO | WO-2013149210 A1 | 10/2013 | |
| WO | WO 2013149210 A1 * | 10/2013 | ......... G05D 23/1902 |
| WO | WO-2014033189 A1 | 3/2014 | |

OTHER PUBLICATIONS

Wikipedia: Grading < https://web.archive.org/web/20140320154817/https://en.wikipedia.org/wiki/Grading_(education)> retrieved by Archive.org on Mar. 20, 2014.*

Wikipedia: Least Squares< https://web.archive.org/web/20140417021259/https://en.wikipedia.org/wiki/Least_squares >retrieved by Archive.org on Apr. 17, 2014.*

International Search Report regarding International Application No. PCT/US2015/029489, dated Jul. 23, 2015.

Written Opinion of the International Searching Authority regarding International Application No. PCT/US2015/029489, dated Jul. 23, 2015.

International Search Report regarding International Patent Application No. PCT/US2015/029509, dated Aug. 19, 2015.

Written Opinion of the International Searching Authority regarding International Patent Application No. PCT/US2015/029509, dated Aug. 19, 2015.

International Search Report regarding International Application No. PCT/US2015/029500, dated Aug. 31, 2015.

Written Opinion of the International Searching Authority regarding International Application No. PCT/US2015/029500, dated Aug. 31, 2015.

Interview Summary regarding U.S. Appl. No. 14/705,263, dated Jul. 1, 2016.

Office Action regarding U.S. Appl. No. 14/705,263, dated Jul. 7, 2016.

U.S. Appl. No. 14/705,263, filed May 6, 2015, Priotomo Abiprojo.

U.S. Appl. No. 14/705,289, filed May 6, 2015, Jeffrey N. Arensmeier.

U.S. Appl. No. 14/705,340, filed May 6, 2015, Fadi M. Alsaleem.

Interview Summary regarding U.S. Appl. No. 14/705,263, dated Aug. 17, 2016.

Interview Summary regarding U.S. Appl. No. 14/705,289, dated Oct. 14, 2016.

Office Action regarding U.S. Appl. No. 14/705,289, dated Nov. 3, 2016.

Examiner's Answer regarding U.S. Appl. No. 14/705,289, dated Jul. 28, 2017.

Extended European Search Report for 15789424.7, dated Dec. 18, 2017.

International Search Report regarding International Application No. PCT/US2015/029507, dated Jul. 27, 2015.

Written Opinion of the International Searching Authority regarding International Application No. PCT/US2015/029507, dated Jul. 27, 2015.

Office Action regarding U.S. Appl. No. 14/705,289, dated Jul. 15, 2016.

Wikipedia: SEER <https://web.archive.org/web/20130906172844/https://en.wikipedia.org/wiki/Seasonal_energy_efficiency_ratio> retrieved by Archive.org on Sep. 6, 2013.

Office Action and Search Report from Chinese Patent Office regarding Chinese Application No. 201580023901.5 dated Jul. 26, 2018.

Office Action and Search Report from Chinese Patent Office regarding Chinese Application No. 201580036090.2 dated May 28, 2018.

Office Action and Search Report from Chinese Patent Office regarding Chinese Application No. 201580036086.6 dated Sep. 4, 2018.

Office Action regarding U.S. Appl. No. 14/705,263, dated Apr. 18, 2016.

* cited by examiner

BUILDING ENVELOPE AND INTERIOR GRADING SYSTEMS AND METHODS

CROSS-REFERENCE TO RELATED APPLICATIONS

This application claims the benefit of U.S. Provisional Application No. 61/989,713 filed on May 7, 2014. The entire disclosures of the applications referenced above are incorporated herein by reference.

FIELD

The present disclosure relates to environmental comfort systems and more particularly to remote monitoring and diagnosis of residential and light commercial environmental comfort systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a building. The target values for the environmental parameters, such as a temperature set point, may be specified by a user or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Monitoring of operation of components in the condensing unit 164 and the air handler unit 136 has traditionally been performed by an expensive array of multiple discrete sensors that measure current individually for each component. For example, a first sensor may sense the current drawn by a motor, another sensor measures resistance or current flow of an igniter, and yet another sensor monitors a state of a gas valve. However, the cost of these sensors and the time required for installation of, and taking readings from, the sensors has made monitoring cost-prohibitive.

SUMMARY

In a feature, a grading system is disclosed. A difference module determines differences between an outdoor ambient temperature of a building and an indoor temperature within the building, determines a first average of the differences of a first day, and determines a second average of the differences of a second day. A storing module stores a first data point for the first day, the first data point including the first average and a first total run time of a heating, ventilation, and/or air conditioning (HVAC) system of the building during the first day, and stores a second data point for the second day, the second data point including the second average and a second total run time of the HVAC system of the building during the second day. A fitting module fits a line to the first and second data points. An envelope grading module generates a grade for an exterior envelope of the building based on a first characteristic of the line. An interior grading module generates a grade for an interior of the building based on a second characteristic of the line. A reporting module generates a displayable report for the building including the grade of the exterior envelope of the building and the grade of the interior of the building.

In a feature, a grading method is disclosed. The grading method includes: determining differences between an outdoor ambient temperature of a building and an indoor temperature within the building; determining a first average of the differences of a first day; determining a second average of the differences of a second day; storing a first data point for the first day, the first data point including the first average and a first total run time of a heating, ventilation, and/or air conditioning (HVAC) system of the building during the first day; storing a second data point for the second day, the second data point including the second average and a second total run time of the HVAC system of the building during the second day; fitting a line to the first and second data points; generating a grade for an exterior envelope of the building based on a first characteristic of the line; generating a grade for an interior of the building based on a second characteristic of the line; and generating a report for display on a display for the building, the report for the building including the grade of the exterior envelope of the building and the grade of the interior of the building.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

According to the present disclosure, a monitoring system can be integrated with a residential or light commercial HVAC (heating, ventilation, or air conditioning) system of a building. The monitoring system can provide information on the status, maintenance, and efficiency of the HVAC system to customers and/or contractors associated with the building. For example, the building may be a single-family residence, and the customer may be the homeowner, a landlord, or a tenant. In other implementations, the building may be a light commercial building, and the customer may be the building owner, a tenant, or a property management company.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, and air conditioners. HVAC systems as described in this application do not necessarily include both heating and air conditioning, and may instead have only one or the other.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
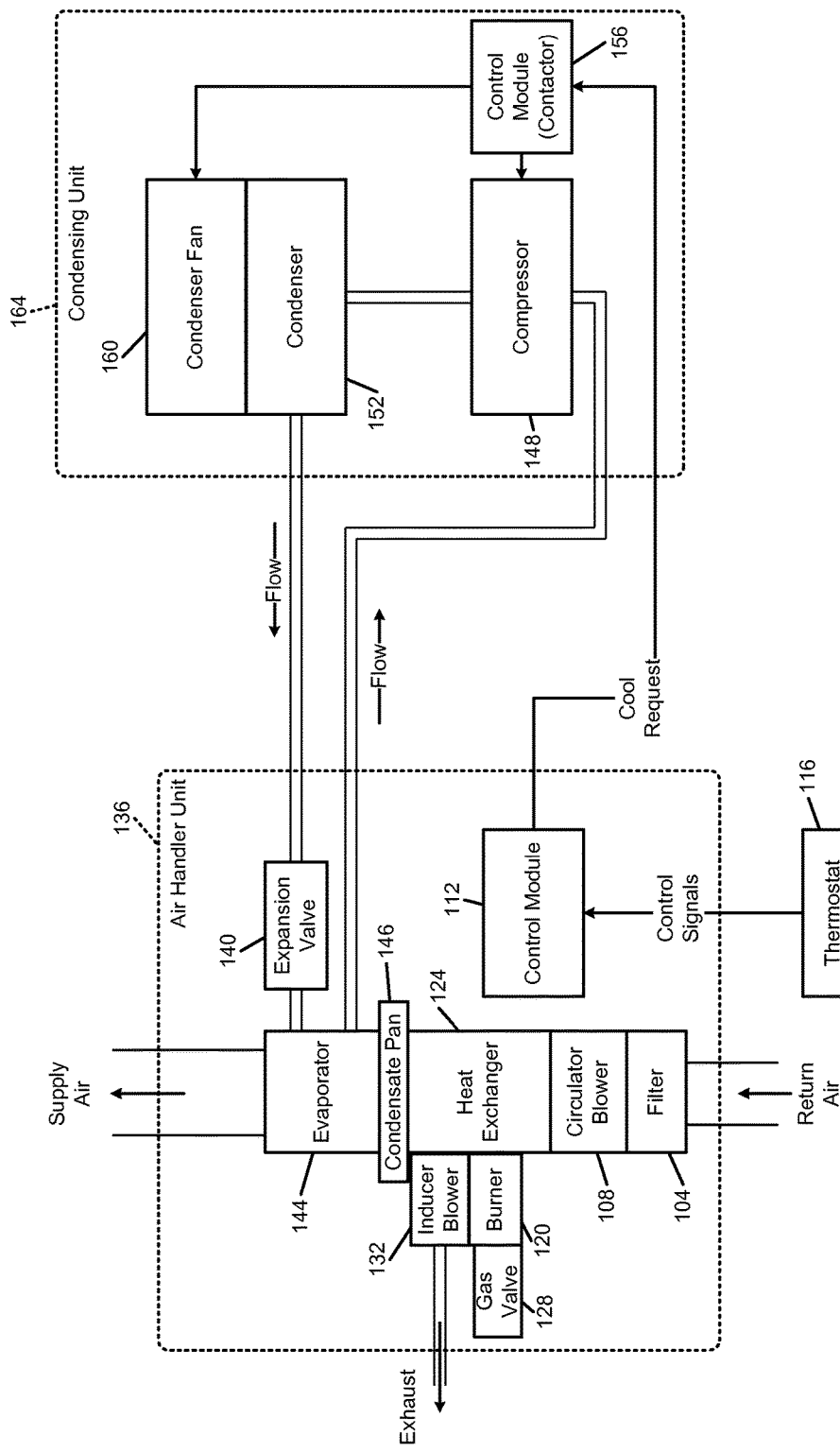
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building. When the flow of refrigerant is reversed, the roles of the evaporator and condenser are reversed—i.e., refrigerant evaporation occurs in what is labeled the condenser while refrigerant condensation occurs in what is labeled as the evaporator.

The air handler monitor and condensing monitor modules monitor operating parameters of associated components of the HVAC system. For example, the operating parameters may include power supply current, power supply voltage, operating and ambient temperatures of inside and outside air, refrigerant temperatures at various points in the refrigerant loop, fault signals, control signals, and humidity of inside and outside air.

The principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. The monitoring system may analyze aggregate current readings to assess operation of the individual components of the hot water heater.

The air handler monitor and condensing monitor modules may communicate data between each other, while one or both of the air handler monitor and condensing monitor modules upload data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as designated HVAC contractors.

A server of the monitoring system includes a processor and memory. The memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues affecting effectiveness or efficiency of the HVAC system, and may receive notifications related to routine maintenance. The methods of notification may take the form of push or pull updates to an application, which may be executed on a smart phone or other mobile device or on a standard computer. Notifications may also be viewed using web applications or on local displays, such as on a thermostat or other displays located throughout the building or on a display (not shown) implemented in the air handler monitor module or the condensing monitor module. Notifications may also include text messages, emails, social networking messages, voicemails, phone calls, etc.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time-domain current stream may reduce the amount of bandwidth necessary to upload the current data. Nevertheless, the present disclosure could also be used with additional current sensors.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. Upon installation, baseline tests are run. For example, this may include running a heating cycle and a cooling cycle, which the remote monitoring system records and uses to identify initial efficiency metrics. Further, baseline profiles for current, power, and frequency domain current can be established.

The server may store baseline data for the HVAC system of each building. The baselines can be used to detect changes indicating impending or existing failures. For example only, frequency-domain current signatures of failures of various components may be pre-programmed, and may be updated based on observed evidence from contractors. For example, once a malfunction in an HVAC system is recognized, the monitoring system may note the frequency data leading up to the malfunction and correlate that frequency signature with frequency signatures associated with potential causes of the malfunction. For example only, a computer learning system, such as a neural network or a genetic algorithm, may be used to refine frequency signatures. The frequency signatures may be unique to different types of HVAC systems but may share common characteristics. These common characteristics may be adapted based on the specific type of HVAC system being monitored.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

The monitoring system can be used by the contractor during and after installation and during and after repair (i) to verify operation of the air handler monitor and condensing monitor modules, as well as (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2A:
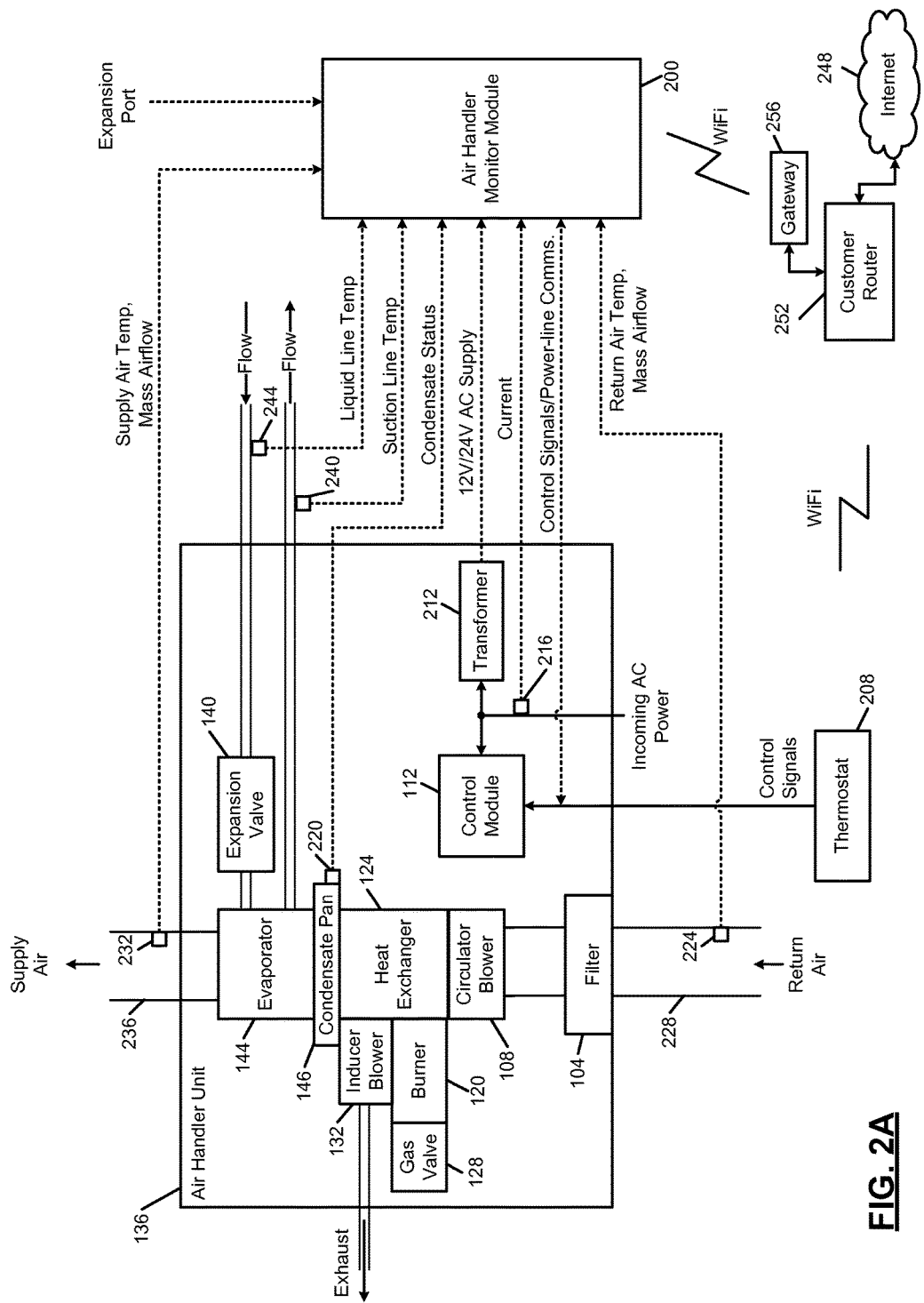
FIG. 2A is a functional block diagram of an example HVAC system including an implementation of an air handler monitor module.
Figure 2B:
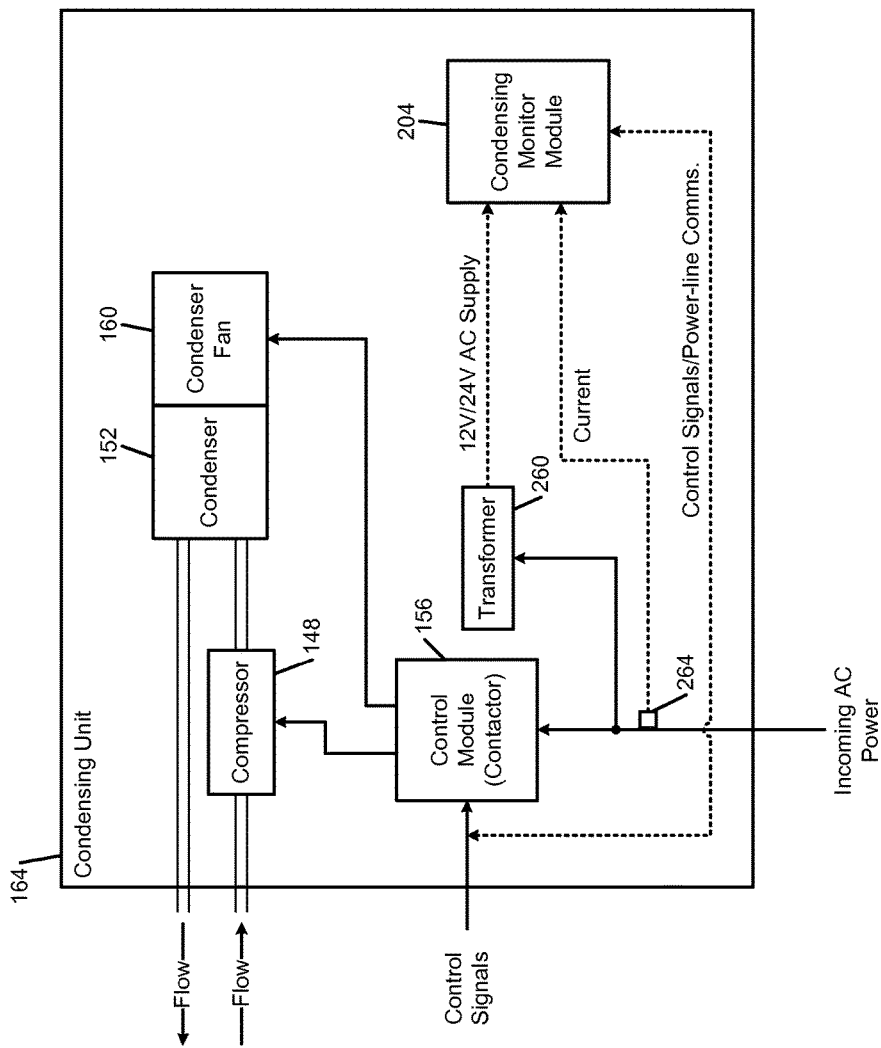
FIG. 2B is a functional block diagram of an example HVAC system including an implementation of a condensing monitor module.

FIGS. 2A-2B are functional block diagrams of an example monitoring system associated with an HVAC system of a building. The air handler unit 136 of FIG. 1 is shown for reference. Because the monitoring systems of the present disclosure can be used in retrofit applications, elements of the air handler unit 136 may remain unmodified. An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capability.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120 volt or nominal 240 volt power. The air handler monitor module 200 then receives power from the transformer 212 and determines the AC line voltage based on the power received from the transformer 212.

For example, frequency, amplitude, RMS voltage, and DC offset may be calculated based on the measured voltages. In situations where 3-phase power is used, the order of the phases may be determined. Information about when the voltage crosses zero may be used to synchronize various measurements and to determine frequency of the AC power based on counting the number of zero crossings within a predetermine time period.

A current sensor 216 measures incoming current to the air handler unit 136. The current sensor 216 may include a current transformer that snaps around one power lead of the incoming AC power. The current sensor 216 may alternatively include a current shunt or a hall effect device. In various implementations, a power sensor (not shown) may be used in addition to or in place of the current sensor 216.

In various other implementations, electrical parameters (such as voltage, current, and power factor) may be measured at a different location, such as at an electrical panel providing power to the building from the electrical utility.

For simplicity of illustration, the control module 112 is not shown to be connected to the various components and sensors of the air handler unit 136. In addition, routing of the AC power to various powered components of the air handler unit 136, such as the circulator blower 108, the gas valve 128, and the inducer blower 132, are also not shown for simplicity. The current sensor 216 measures the current entering the air handler unit 136 and therefore represents an aggregate current of the current-consuming components of the air handler unit 136.

The control module 112 controls operation in response to signals from a thermostat 208 received over control lines. The air handler monitor module 200 monitors the control lines. The control lines may include a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

The control lines may be monitored by attaching leads to terminal blocks at the control module 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a signal screw head.

In various implementations, the cool signal from the thermostat 208 may be disconnected from the control module 112 and attached to the air handler monitor module 200. The air handler monitor module 200 can then provide a switched cool signal to the control module 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148. A liquid line temperature sensor 244 measures the temperature of refrigerant in a liquid line traveling from the condenser 152 of FIG. 2B to the expansion valve 140.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 (shown in FIG. 2B), these control signals can be used for communication between the air handler monitor module 200 and the condensing monitor module 204 (shown in FIG. 2B).

The air handler monitor module 200 may transmit frames of data corresponding to periods of time. For example only, 7.5 frames may span one second (i.e., 0.1333 seconds per frame). Each frame of data may include voltage, current, temperatures, control line status, and water sensor status. Calculations may be performed for each frame of data, including averages, powers, RMS, and FFT. Then the frame is transmitted to the monitoring system.

The voltage and current signals may be sampled by an analog-to-digital converter at a certain rate, such as 1920 samples per second. The frame length may be measured in terms of samples. When a frame is 256 samples long, at a sample rate of 1920 samples per second, there will be 7.5 frames per second.

The sampling rate of 1920 Hz has a Nyquist frequency of 960 Hz and therefore allows an FFT bandwidth of up to approximately 960 Hz. An FFT limited to the time span of a single frame may be calculated for each frame. Then, for that frame, instead of transmitting all of the raw current data, only statistical data (such as average current) and frequency-domain data are transmitted.

This gives the monitoring system current data having a 7.5 Hz resolution, and gives frequency-domain data with approximately the 960 Hz bandwidth. The time-domain current and/or the derivative of the time-domain current may be analyzed to detect impending or existing failures. In addition, the current and/or the derivative may be used to determine which set of frequency-domain data to analyze. For example, certain time-domain data may indicate the approximate window of activation of a hot surface igniter, while frequency-domain data is used to assess the state of repair of the hot surface igniter.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, WiFi (IEEE 802.11). In various implementations, a gateway 256 is implemented, which creates a wireless network with the air handler monitor module 200. The gateway 256 may interface with the customer router 252 using a wired or wireless protocol, such as Ethernet (IEEE 802.3).

The thermostat 208 may also communicate with the customer router 252 using WiFi. Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on inputs from the other. For example, various faults identified based on information from the air handler monitor module 200 may cause the remote monitoring system to adjust temperature set points of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over a lower-voltage HVAC control line.

In various implementations, the current sensor 400 may be omitted, and instead a voltage sensor (not shown) may be used. The voltage sensor measures the voltage of an output of a transformer internal to the control module 112, the internal transformer providing the power (e.g., 24 Volts) for the control signals. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor.

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on geographical location of the building may be used to determine sun load, outside ambient air temperature, precipitation, and humidity.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over a lower-voltage HVAC control line.

Figure 2C:
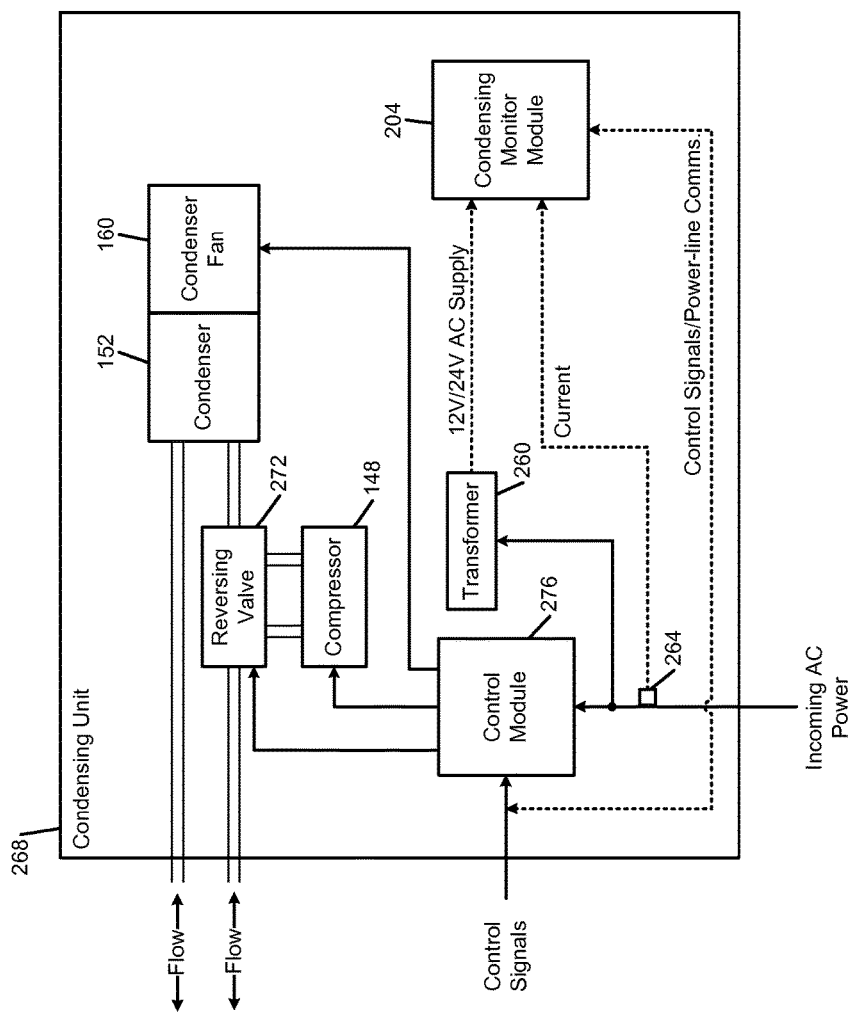
FIG. 2C is a functional block diagram of an example HVAC system based on a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

Figure 3:
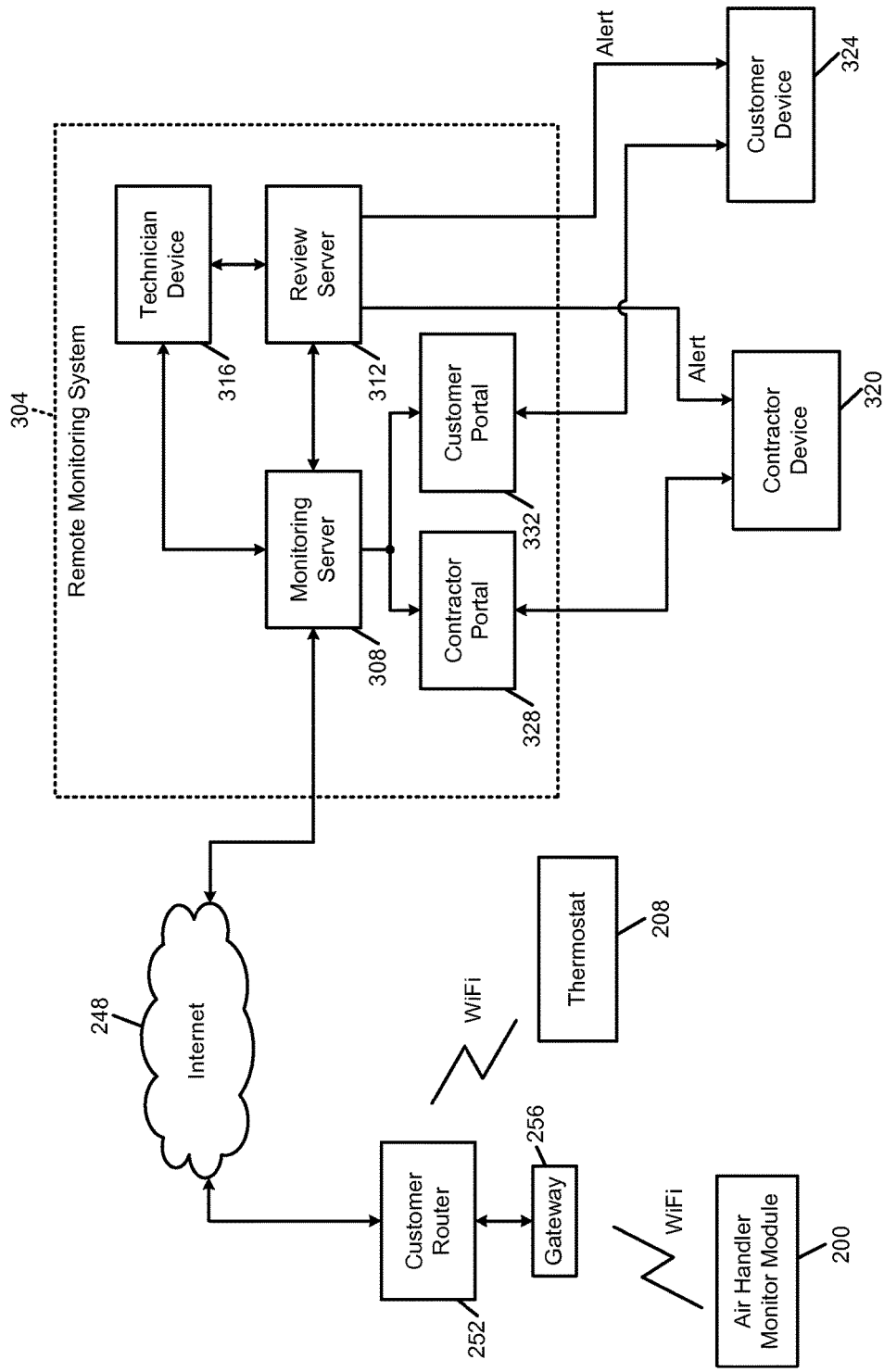
FIG. 3 is a high level functional block diagram of an example system including an implementation of a remote monitoring system.

In FIG. 3, the air handler monitor module 200 and the thermostat 208 are shown communicating, using the customer router 252, with a remote monitoring system 304 via the Internet 248. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 304 includes a monitoring server 308 that receives data from the air handler monitor module 200 and the thermostat 208 and maintains and verifies network continuity with the air handler monitor module 200. The monitoring server 308 executes various algorithms to identify problems, such as failures or decreased efficiency, and to predict impending faults.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both of a contractor device 320 or a customer device 324. The technician may be determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network. For example only, the technician device may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

Figure 4:
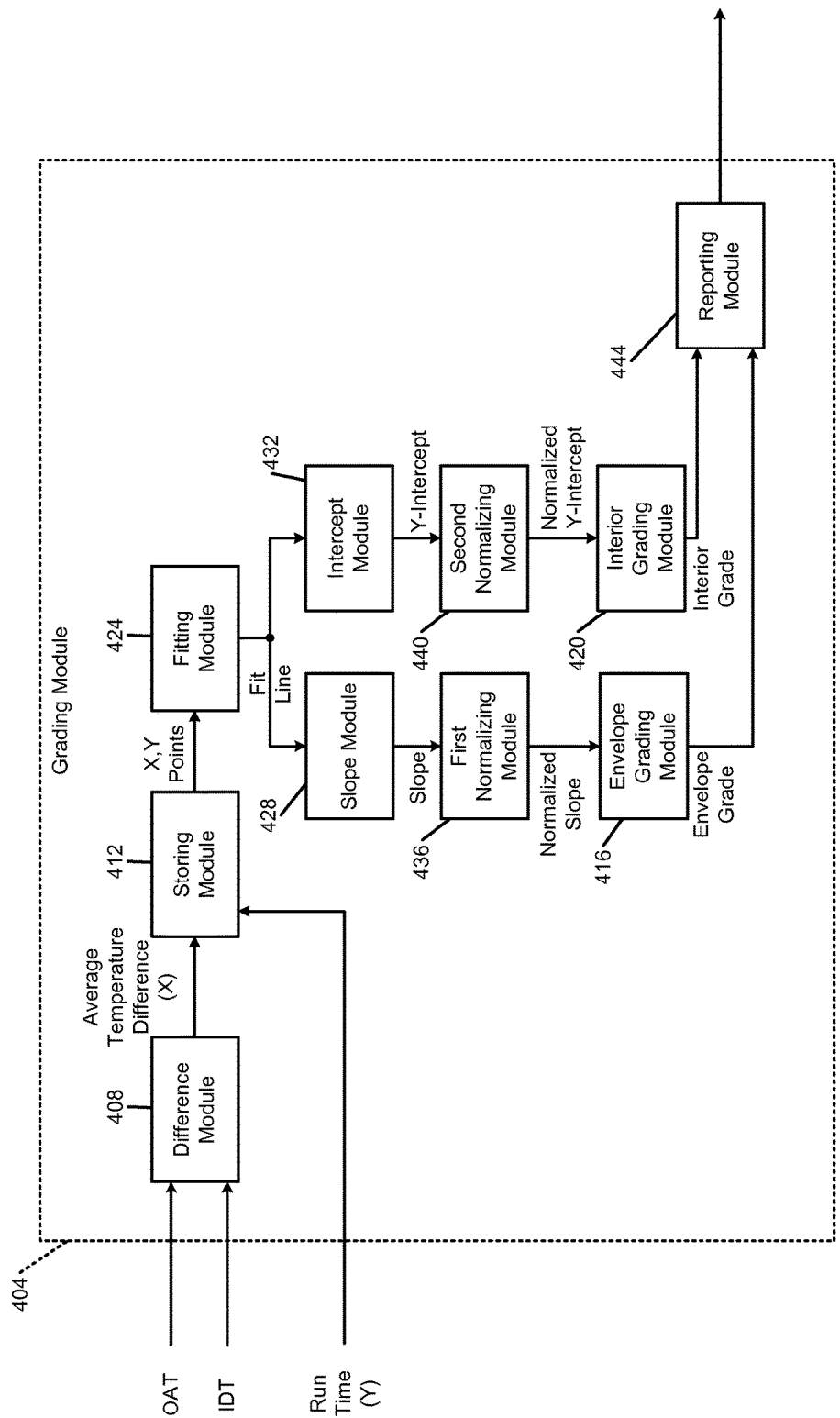
FIG. 4 is a functional block diagram of an example grading module that grades an envelope of a building and an interior of a building.

FIG. 4 includes a functional block diagram of an example grading module 404. The grading module 404 may be implemented, for example, in the monitoring server 308. The grading module 404 determines a grade for an envelope of a building and a grade for interior activity of the building. The envelope of the building may include, for example, walls, insulation, windows, and other components of the building that insulate the interior of the building from ambient conditions. The interior activity of the building may include, for example, internal thermal loads within the building (e.g., electrical power consuming devices, people, etc.), thermal deficiencies within the building (e.g., leaks in ductwork, faulty/improperly sized cooling unit, etc.), and deficiencies of the HVAC system (e.g., low charge, high charge, dirty filter, etc.).

A difference module 408 determines an average temperature difference (X) for a day based on an outdoor ambient temperature (OAT) of the building and an indoor temperature of the building (IDT) during that day. The indoor temperature may be, for example, the setpoint temperature of a thermostat of the building or a return air temperature (RAT) of the building. The OAT and the RAT may be measured using temperature sensors as described above.

The OAT and the IDT may be sampled every predetermined period by the air handler monitor module 200 and/or the condensing monitor module 204. The difference module 408 may determine a sample difference between the OAT and the IDT each time that the OAT and the IDT are sampled. For example only, the difference module 408 may set a sample difference equal to an absolute value of the difference between a set of samples of the OAT and the IDT at a given time.

In various implementations, the difference module 408 may set the sample differences equal to the OAT minus the IDT during cooling and set the sample differences equal to the IDT minus the OAT during heating. The difference module 408 may determine that heating is being performed, for example, when the OAT is less than a first predetermined temperature, such as approximately 45 degrees Fahrenheit (° F.) or another suitable temperature. The difference module 408 may determine that cooling is being performed, for example, when the OAT is greater than a second predetermined temperature, such as approximately 75° F. or another suitable temperature that is greater than the first predetermined temperature.

The difference module 408 averages the sample differences obtained over a period of one day to determine the average temperature difference for that day. The difference module 408 may discard sample differences that are negative such that those values are not included in the determination of the average temperature difference. The difference module 408 determines a value of the average temperature difference each day.

The difference module 408 may indicate whether each sample difference is for cooling or heating. For days that include only sample differences indicated as cooling, the difference module 408 may indicate that those days' average temperature differences are for cooling. For days that include only sample differences for heating, the difference module 408 may indicate that those days' average temperature differences are for heating. For days that include both sample differences indicated as cooing and sample differences indicated as heating, the difference module 408 may indicate that those days' average temperature differences are mixed heating/cooling. Average temperature differences indicated to be for mixed heating/cooling days may be omitted.

A storing module 412 stores the average temperature difference (X) determined for a day with a total run time (Y) of the HVAC system of the building during that day. In various implementations, the storing module 412 may omit storing and discard average temperature differences and total run times of mixed heating/cooling days. The grading module 404 may monitor operation of the HVAC system and determine the total run time of the HVAC system of the building each day. For example, for heating days, the grading module 404 may determine the total run time of the HVAC system based on the total period during the day when a heating request was output by the thermostat of the building. For cooling days, the grading module 404 may determine the total run time of the HVAC system based on the total period during the day when a cooling request was output by the thermostat of the building. Additionally or alternatively, the air handler monitor module 200 or the condensing monitor module 204 may track the total run time of the HVAC system of each day and provide the daily total run times of the HVAC system to the grading module 404.

In various implementations, a power consumption per unit time (e.g., Kilowatts per hour) or an energy usage (e.g., kBtu) may be used in place of total run time. The metric used may be normalized by the area (e.g., square footage) of the building. In various implementations, the HVAC system may include multiple heating and/or cooling systems. In such implementations, the metric used may be a total run time, power consumption, or energy usage for all of the heating and cooling systems.

The storing module 412 stores data points for respective days. Each data point includes the average temperature difference for that day and the total run time of the HVAC system of the building during that day. Each data point may be represented using a 2-dimensional coordinate system, such as a Cartesian X-Y coordinate system, which may also be referred to as a rectangular coordinate system. For example, a data point for a day may be represented as (X,Y), where X is the average of the sample differences during the day and Y is the total run time of the HVAC system during the day.

Each predetermined period, an envelope grading module 416 and an interior grading module 420 generate grades of the envelope and the interior activities of the building, respectively. The envelope and interior grading modules 416 and 420 generate the grades for a predetermined period based on the stored data points for the days falling within that predetermined period. The envelope and interior grading modules 416 and 420 may generate the grades for heating for a predetermined period based on the stored data points for heating days falling within that predetermined period. The envelope and interior grading modules 416 and 420 may generate the grades for cooling for a predetermined period based on the stored data points for cooling days falling within that predetermined period.

For example, the envelope and interior grading modules 416 and 420 may generate the grades monthly, every predetermined number of days, and/or seasonally. The envelope and interior grading modules 416 and 420 generate the grades for a month based on the stored data points for days within that month. The envelope and interior grading modules 416 and 420 generate the grades for a predetermined number of days based on the stored data points for days during that predetermined number of days. The envelope and interior grading modules 416 and 420 generate the grades for a season based on the stored data points for days during that season. Determination of the grades by the envelope and interior grading modules 416 and 420 is performed as discussed in further detail below. For periods having only stored data points for heating, grades for cooling may be omitted. Conversely, for periods having only stored data points for cooling, grades for heating may be omitted.

A fitting module 424 fits a line to the stored data points for days within a predetermined period, such as a month, season, or a predetermined number of days. The stored data points may be grouped into sets of stored heating data points and stored cooling data points. The fitting module 424 may fit the line to the stored data points for the days within the predetermined period using linear least squares line fitting or another suitable method of fitting a line to a given set of data points. The fitting module 424 may therefore fit one line to stored cooling data points and one line to stored heating data points.

The line fit to the data points for the days within the predetermined period may be represented by a linear equation, such as:

$$Y = mX + b.$$

A slope module 428 determines a slope of the line fit to the data points for the days within the predetermined period. For example, in the linear equation above, m is the slope. An intercept module 432 determines a Y-intercept of the line fit to the data points for the days within the predetermined period. The Y-intercept corresponds to the point where the line fit to the data points intersects the Y-axis of the 2-dimensional coordinate system. In other words, the Y-intercept corresponds to the value of Y (the total run time) where the value of X (average temperature difference) is equal to zero.

A first normalizing module 436 normalizes the slope of the line to determine a normalized slope. The first normalizing module 436 may normalize the slope of the line, for example, based on a predetermined gain. For example only, the first normalizing module 436 may set the normalized slope equal to a product of the slope of the line and the predetermined gain. The predetermined gain may be, for example, a fixed calibrated value. The first normalizing module 436 may also multiply the product by 100.

A second normalizing module 440 normalizes the Y-intercept of the line to produce a normalized Y-intercept. The second normalizing module 440 may normalize the Y-intercept of the line, for example, based on the number of hours in a day. For example only, the second normalizing module 440 may set the normalized Y-intercept equal to the Y-intercept of the line divided by 24. The second normalizing module 440 may also multiply the result of the division by 100.

The envelope grading module 416 determines an envelope grade for the building over the predetermined period based on the normalized slope. For example, the envelope grading module 416 may determine the envelope grade by subtracting the normalized slope from 100. The envelope grade may therefore be a numerical value between 0 and 100, where 100 corresponds to a best envelope grade and 0 corresponds to a worst envelope grade. An envelope grade may be determined for stored heating data samples, and an envelope grade may be determined for stored cooling data samples.

The numerical value can be converted into, for example, a letter grade, such as A, B, C, D, or E. Predetermined ranges of numeric values can be defined for each possible letter grade. The envelope grading module 416 may determine a letter grade for the building and the predetermined period according to the predetermined range within which the numeric value falls. A letter envelope grade may be determined for stored heating data samples, and a letter envelope grade may be determined for stored cooling data samples.

The interior grading module 420 determines an interior grade for the building over the predetermined period based on the normalized Y-intercept. For example, the interior grading module 420 may determine the interior grade by subtracting the normalized Y-intercept from 100. The interior grade may therefore be a numerical value between 0 and 100, where 100 corresponds to a best interior grade and 0 corresponds to a worst interior grade. An interior grade may be determined for stored heating data samples, and an interior grade may be determined for stored cooling data samples.

The numerical value can be converted into, for example, a letter grade, such as A, B, C, D, or E. Predetermined ranges of numeric values can be defined for each possible letter grade. The predetermined ranges may be the same or different than those used to determine the exterior grades. The interior grading module 420 may determine a letter grade for the building and the predetermined period according to the predetermined range within which the numeric value falls. A letter interior grade may be determined for stored heating data samples, and a letter interior grade may be determined for stored cooling data samples.

A reporting module 444 generates a displayable report for the building based on the envelope and interior grades of the building. For example, the reporting module 444 may generate the report monthly, seasonally, or every predetermined number of days when the interior and envelope grades are determined. The report includes the envelope and interior grades (e.g., numeric and/or letter). The report may also include other information, such as a change in one or more of the grades determined for a previous predetermined period and/or grades determined for other buildings located near the building over the predetermined period. The report may be displayed on a display, such as the contractor device 320 and/or the customer device 324.

Figure 5:
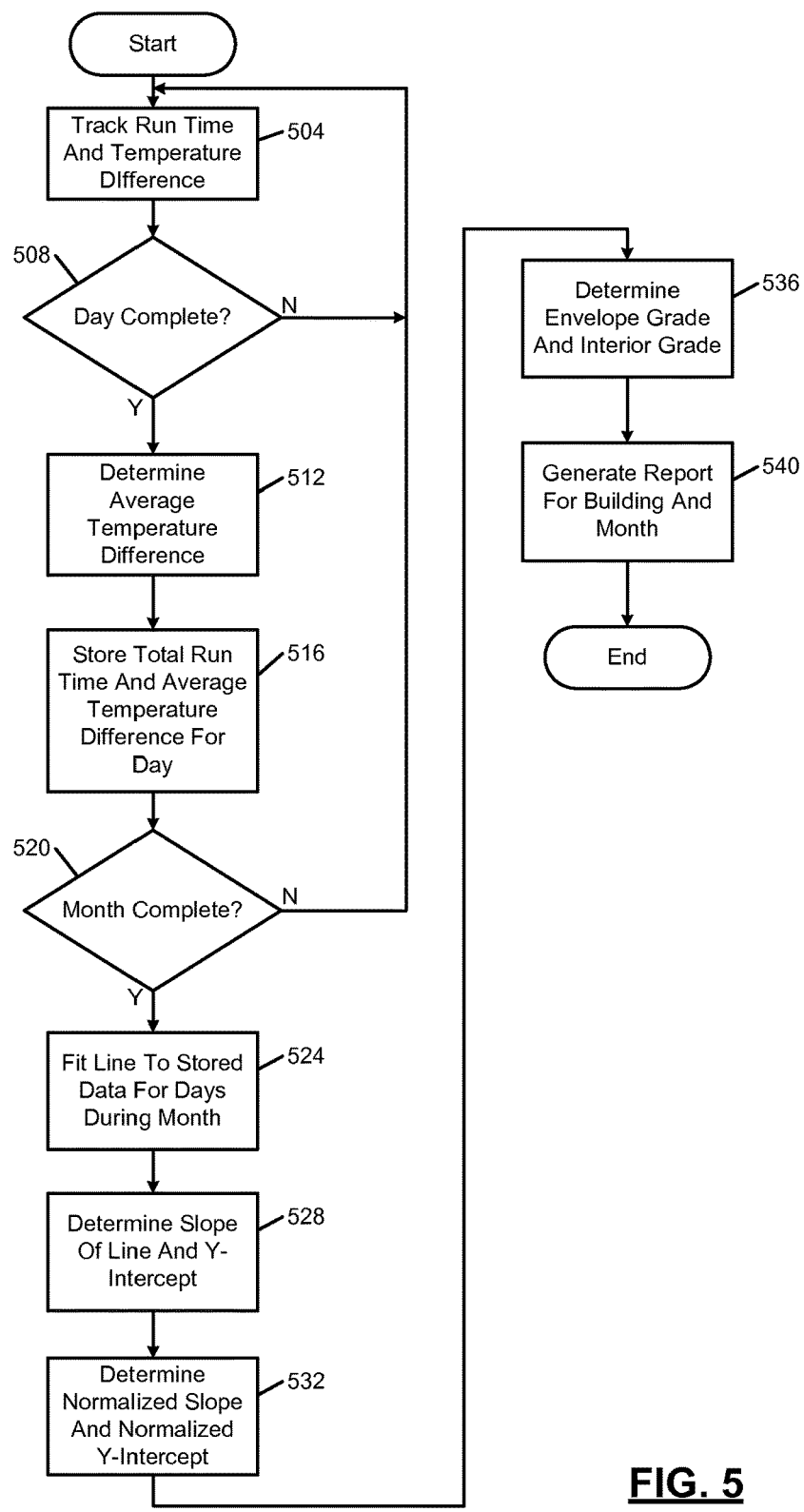
FIG. 5 is a flowchart depicting an example method of grading the envelope of a building and the interior of a building.

FIG. 5 is a flowchart depicting an example method of grading the envelope and the interior of a building and generating a report including the envelope and interior grades of the building over a period of a month. While the example of FIG. 5 is discussed in terms of a period of a month, as discussed above, another suitable period may be used, such as a season or a predetermined number of days.

Control begins at 504 where control tracks the run time of the HVAC system and determines the sample differences between the OAT and the IDT. As described above, the sample differences may be identified as heating or cooling values. At 508, control determines whether a day is complete. If 508 is true, control continues with 512. If 508 is false, control returns to 508 to continue tracking the run time and determining the sample differences. At 512, control averages the sample differences (between the OAT and the IDT) determined during the day to determine the average temperature difference for the day. As described above, the average temperature difference may be identified as a heating average temperature difference if only heating sample differences were determined during that day. The average temperature difference may be identified as a cooling average temperature difference if only cooling sample differences were determined during that day. If both heating and cooling sample differences were determined, the average temperature difference may be identified as mixed.

At 516, control stores a data point for the day including the average temperature difference and the total run time. Cooling and heating temperature differences may be stored, while mixed average temperature differences may be omitted and not stored. Control determines whether a month is complete at 520. If 520 is true, control continues with 524. If 520 is false, control returns to 504 to track the run time and the sample differences for another day.

At 524, control fits a line to the stored data points for the days within the month. A line may be fit to the stored data points for heating and a line may be fit to the stored data points for cooling. Each of the stored data points includes an average temperature difference for that day and a total run time for that day. Control may fit the line (s0, for example, using a linear least squares line fitting or another suitable method of fitting a line to a given set of data points.

Control determines the slope of the fit line(s) and the Y-intercept of the fit line at 528. At 532, control normalizes the slope(s) of the fit line(s) to determine the normalized slope and normalizes the Y-intercept of the fit line(s) to determine the normalized Y-intercept. For example only, control may normalize the Y-intercept by dividing the Y-intercept by 24 and multiplying the result by 100. Control may normalize the slope, for example, by multiplying the slope by the predetermined gain and multiplying the result by 100.

At 536, control determines the envelope grade for the building during the month and determines the interior grade for the building during the month. As discussed above, an envelope grade and an interior grade may be determined for heating, and an envelope grade and an interior grade may be determined for cooling. Control determines the envelope grade based on the normalized slope. For example, control may set the envelope grade based on or equal to 100—the normalized slope. Control determines the interior grade based on the normalized Y-intercept. For example, control may set the interior grade based on or equal to 100—the normalized Y-intercept. Control may also convert one or more of the numerical values to letter grades, as discussed above.

Control generates a report including the envelope grade(s) and the interior grade(s) for the building and the month at 540. Control may generate the report to include other information, such as one or more changes in the envelope and/or interior grade of the building from one or more previous months and/or envelope and interior grading information (e.g., averages) of other buildings in the area during that month. The report can be displayed on a display, such as a display of the customer device 324 and/or a display of the contractor device 320.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A grading system for a building, comprising:
   one or more processors;
   memory including instructions that, when executed by the one or more processors, cause the one or more processors to:
   receive, from sensors of a building over a network, indoor temperatures of the building and outdoor ambient temperatures at the building;
   determine differences between the outdoor ambient temperatures of the building and the indoor temperatures within the building;
   determine a first average of the differences of a first day;
   determine a second average of the differences of a second day;
   store a first data point for the first day, the first data point including the first average and a first total run time of a heating, ventilation, and/or air conditioning (HVAC) system of the building during the first day;
   store a second data point for the second day, the second data point including the second average and a second total run time of the HVAC system of the building during the second day;
   fit a line to the first and second data points;
   determine a slope of the line;
   generate a first grade for an exterior envelope of the building based on the slope of the line;
   based on the line, determine a third total run time of the HVAC system where a third average of the differences is equal to zero;
   based on the third total run time where the third average of the differences is equal to zero, generate a second grade for internal thermal loads within the building, thermal deficiencies within the building, and deficiencies of the HVAC system of the building;
   generate a displayable report for the building including the first grade of the exterior envelope of the building and the second grade; and
   transmit the displayable report to a user computing device associated with the building.

2. The grading system of claim 1 wherein the instructions include instructions that, when executed by the one or more processors, further cause the one or more processors to normalize the slope of the line to produce a normalized slope, and
   wherein the instructions include instructions that, when executed by the one or more processors, cause the one or more processors to generate the first grade of the exterior envelope of the building based on the normalized slope of the line.

3. The grading system of claim 2 wherein the instructions include instructions that, when executed by the one or more processors, cause the one or more processors to set the first grade of the exterior envelope of the building based on 100 minus the normalized slope.

4. The grading system of claim 3 wherein the instructions include instructions that, when executed by the one or more processors, cause the one or more processors to set the normalized slope equal to the slope of the line multiplied by a predetermined gain value and by 100.

5. The grading system of claim 1 wherein the instructions include instructions that, when executed by the one or more processors, further cause the one or more processors to normalize the third total run time to produce a normalized value, and
   wherein the instructions include instructions that, when executed by the one or more processors, cause the one or more processors to generate the second grade based on the normalized value.

6. The grading system of claim 5 wherein the instructions include instructions that, when executed by the one or more processors, cause the one or more processors to set the second grade based on 100 minus the normalized value.

7. The grading system of claim 5 wherein the instructions include instructions that, when executed by the one or more processors, cause the one or more processors to normalize the third total run time based on a 24 hour day to produce the normalized value.

8. The grading system of claim 7 wherein the instructions include instructions that, when executed by the one or more processors, cause the one or more processors to set the normalized value equal to the third total run time divided by 24 hours and multiply a result of the division by 100.

9. The grading system of claim 1 wherein the instructions include instructions that, when executed by the one or more processors, cause the one or more processors to fit the line to the first and second data points using linear least squares line fitting.

10. The grading system of claim 1 wherein the instructions include instructions that, when executed by the one or more processors, cause the one or more processors to:
    store data points for each day, each data point for a day and including an average of the differences of the day and a total run time of the HVAC system of the building during the day; and
    fit the line to all of the data points of a predetermined period; and
    the predetermined period includes one of a month, a season, and a predetermined number of days.

11. A grading method for a building, comprising:
    by one or more processors, receiving, from sensors of a building over a network, indoor temperatures of the building and outdoor ambient temperatures at the building;
    by the one or more processors, determining differences between the outdoor ambient temperatures of the building and the indoor temperatures within the building;
    by the one or more processors, determining a first average of the differences of a first day;
    by the one or more processors, determining a second average of the differences of a second day;
    by the one or more processors, storing a first data point for the first day, the first data point including the first average and a first total run time of a heating, ventilation, and/or air conditioning (HVAC) system of the building during the first day;
    by the one or more processors, storing a second data point for the second day, the second data point including the second average and a second total run time of the HVAC system of the building during the second day;
    by the one or more processors, fitting a line to the first and second data points;
    by the one or more processors, determining a slope of the line;

by the one or more processors, generating a first grade for an exterior envelope of the building based on the slope of the line;

by the one or more processors, based on the line, determining a third total run time of the HVAC system where a third average of the differences is equal to zero;

by the one or more processors, based on the third total run time where the third average of the differences is equal to zero, generating a second grade for internal thermal loads within the building, thermal deficiencies within the building, and deficiencies of the HVAC system of the building;

by the one or more processors, generating a report for the building including the first grade of the exterior envelope of the building and the second grade; and by the one or more processors, transmitting the displayable report to a user computing device associated with the building.

12. The grading method of claim 11 further comprising:
normalizing the slope of the line to produce a normalized slope,
wherein generating the first grade of the exterior envelope includes generating the first grade of the exterior envelope of the building based on the normalized slope of the line.

13. The grading method of claim 12 wherein generating the first grade of the exterior envelope includes setting the first grade of the exterior envelope of the building based on 100 minus the normalized slope.

14. The grading method of claim 11 further comprising:
normalizing the third total run time to produce a normalized value,
wherein generating the second grade includes generating the second grade based on the normalized value.

15. The grading method of claim 14 wherein generating the second grade includes setting the second grade based on 100 minus the normalized value.

16. The grading method of claim 14 further comprising normalizing the third total run time based on a 24 hour day to produce the normalized value.

17. The grading method of claim 11 wherein fitting the line includes fitting the line to the first and second data points using linear least squares line fitting.

18. The grading method of claim 11 further comprising:
storing data points for each day, each data point for a day and including an average of the differences of the day and a total run time of the HVAC system of the building during the day,
wherein fitting the line includes fitting the line to all of the data points of a predetermined period,
wherein the predetermined period includes one of a month, a season, and a predetermined number of days.

* * * * *